March 5, 1935.  C. J. COLLEY  1,992,991
STEAM TRAP TELLTALE DEVICE AND METER
Filed Oct. 3, 1932
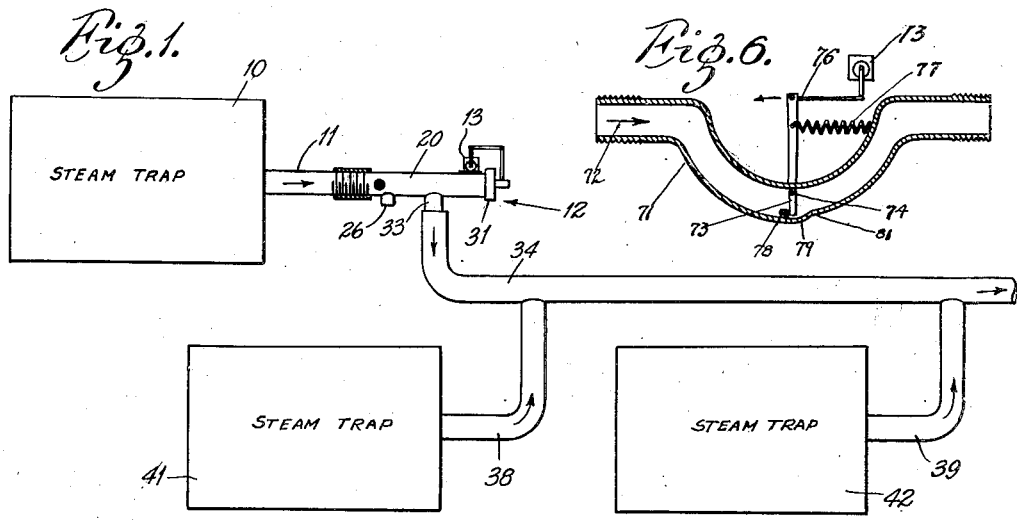
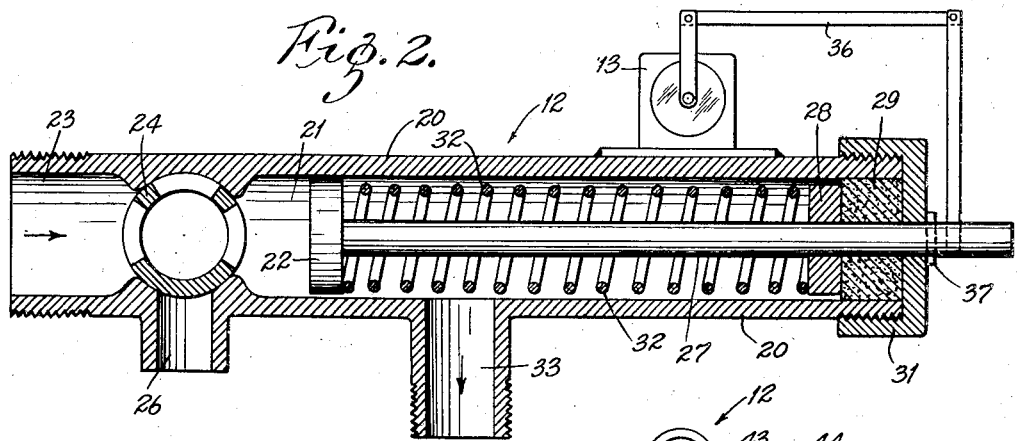
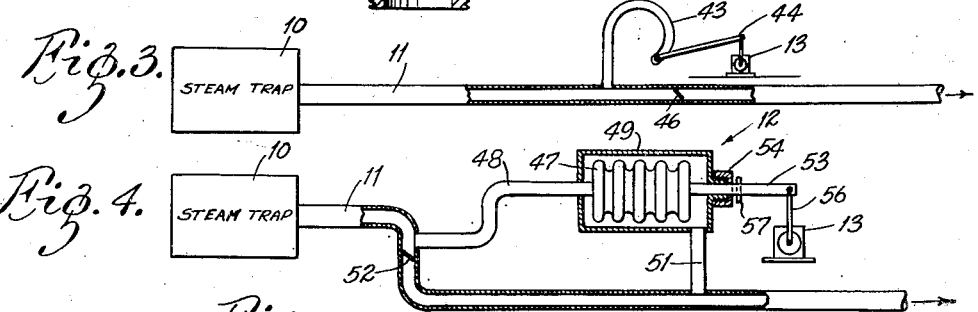
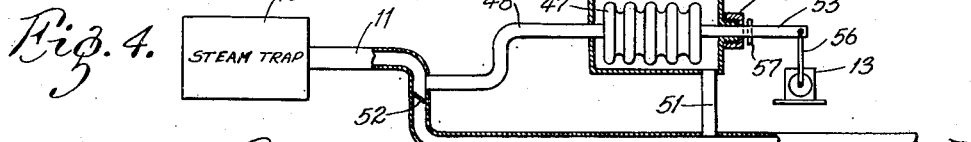
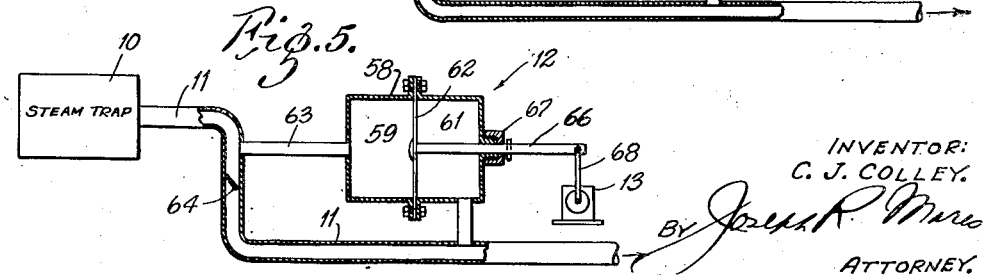
INVENTOR:
C. J. COLLEY.
By Joseph R. Muro
ATTORNEY.

Patented Mar. 5, 1935

1,992,991

UNITED STATES PATENT OFFICE 1,992,991

STEAM TRAP TELLTALE DEVICE AND METER

Charles J. Colley, St. Louis, Mo.

Application October 3, 1932, Serial No. 636,002

11 Claims. (Cl. 73—28)

This invention relates to steam traps of the intermittent discharge type such, for example, as those which include a float valve and it has particular relation to an auxiliary mechanism for recording the operation of the valve.

The object of the invention is to provide a device capable of registering the amount of steam and if desired the rate at which the steam is consumed at any point by measuring the amount of condensate discharged by a trap.

A further object of the invention is to provide a tell tale device for indicating the operation of a steam trap.

Briefly stated, the invention involves the interposition of a fluid pressure responsive element on the discharge side of the trap which is actuated by the water that is vented intermittently by the trap and which in turn actuates a counting device. For this purpose one may employ a variety of pressure responsive elements including a Bourdon tube, bellows, diaphragm or preferably piston or flap valve.

The adaptation of these elements to the present invention may be understood by referring to the drawing and the accompanying description.

Figure 1 is an elevational view of an embodiment of the invention which is preferred, illustrating the relationship of a recording device to a steam condensate system in which a plurality of traps are employed.

Figure 2 is a sectional view on an enlarged scale of the pressure responsive element illustrated in Figure 1.

Figure 3 represents an elevational view, partly in section, of an embodiment of a recording mechanism in which a Bourdon tube is employed as the pressure responsive element.

Figure 4 is likewise an elevational view, partly in section, of a recording device in which a bellows is employed as the pressure responsive means.

Figure 5 is an elevational view, partly in section, of a recording device in which a flexible diaphragm is employed as the pressure responsive element; and Figure 6 is an elevational view, partly in cross-section, of a recording device in which the pressure responsive element is a flap valve which is positioned in the condensate line.

The embodiments illustrated in the drawing consist of four major elements: a steam trap 10 of the intermittent discharge type, such for example as the ordinary float type, wherein a float mechanism trips a discharge valve and thereby allows the water which has accumulated in the trap to vent through a discharge line 11. After the trap is empty the valve of the trap closes and condensate is accumulated until the volume reaches a predetermined tripping position. Inasmuch as the amount of condensate which must accumulate before the valve is tripped is readily ascertainable and practically constant, the number of discharges affords an accurate measure of the quantity of condensate vented through the trap. A fluid pressure responsive means 12 is interposed in the condensate discharge line 11 which actuates a counting mechanism 13.

Referring particularly to the actuating mechanism illustrated in Figures 1 and 2, it is to be noted that it includes a casting 20 which includes a fluid chamber 21 wherein a piston 22 is adapted to reciprocate. The fluid inlet port end 23 of the casting 20 includes a pet cock 24 that is normally open to the chamber 21 as illustrated, but may be turned 90° counter-clockwise to permit fluid to discharge through opening 26 for the purpose of ascertaining whether the trap is leaking. A piston rod 27 projects through a slip washer 28 and a steam packing 29, as well as a threaded cap 31 that is screwed to the extremity of the casting 20 opposite the inlet port.

A spring 32 encircles the connecting rod 27 and urges the piston into a normally closed position as illustrated. The fluid which enters the inlet port 23 is discharged from the chamber through a discharge port 33 that is integral with the casting 20. The end thereof is threaded in order that it may be connected conveniently to a condensate line 34 (see Fig. 1) which may receive condensate from other steam traps. Sufficient clearance is provided between the piston and the wall of the casting to permit any trap leakage condensate therethrough without creating a pressure in the chamber 21 which might be sufficient to actuate the piston from time to time independently of the normal trap discharge. The outer extremity of the piston rod is connected by means of a linkage 36 to a counting mechanism 13.

When more than one trap is connected to the same condensate line a back pressure is created each time a trap discharges tending to actuate the piston. While such motion would not actuate the counting mechanism illustrated in Figure 2 it may be obviated by introducing a key 37 which abuts the cap 31. There being sufficient clearance between the piston and the wall of the chamber to permit equalization of pressure, there is little, if any, tendency for the piston 22 to move against the pressure of the spring when the pressure caused by the discharge of another trap subsides.

In Figure 1 but a single recording device is illustrated. To measure the condensate from the other steam traps a pressure responsive mechanism and counting mechanism may be interposed in each of the lines 38 and 39 which connect traps 41 and 42 respectively to the condensate line 34.

The counting mechanism 13 may be employed simply for the purpose of enumerating the number of times the piston has been actuated which in turn represents the number of times the trap has discharged and gives a direct measure of the amount of condensate which has been discharged, or it may be employed merely to indicate that the trap is functioning. Obviously, if the number of times that a trap discharges is known, a marked variation from this figure indicates an abnormal condition either in the operation of the trap or in the steam consumption. Thus, the recording device may be employed merely as a tell tale for proving or disproving the normal operation of the trap or if the quantity of condensate is of interest the mechanism may be employed for measuring the condensate.

In Figure 3 a Bourdon tube 43 is connected to the condensate line 11 and actuates a counting mechanism through a linkage 44. In order that the pressure produced by the discharge of another trap into a common condensate line does not react on the tube, a check valve 46 is interposed in the line which prevents an accumulation of pressure on the upper side of the line. It also functions to introduce sufficient resistance to the flow of condensate from the trap 10 through the line 11 to build a pressure sufficient to operate the Bourdon tube. Obviously, when only one trap discharges into a line and where the discharge line 11 affords sufficient resistance to the flow of the condensate to create an operative pressure at the tube 43, a check valve such as is indicated is unnecessary.

In Figure 4 a bellows 47 is connected to the condensate line 11 by means of a pipe 48. The bellows is enclosed in a chamber 49 which is itself connected by means of a tube 51 to the line 11 below a check valve 52. The bellows is adapted to actuate a connecting rod 53 which passes through a stuffing box 54 and is connected at its outer extremity to a counting mechanism by means of a suitable link 56. A key 57 may be employed as in Figure 2. The check valve 52 affords sufficient resistance to the flow of the condensate from the trap to create the necessary pressure to operate the bellows which in turn actuates the connecting rod axially.

Figure 5 represents an embodiment which is similar in some respects to Figure 4. It includes a chamber 58 which is divided into two compartments 59 and 61 by a flexible diaphragm 62. Compartment 59 is connected to condensate line 11 by a tube 63 above the check valve 64. Compartment 61 is connected to condensate line 11 below a check valve 64. A connecting rod 66 is secured to and actuated axially by the diaphragm; it projects from compartment 61 through a stuffing box 67 and is connected to a counting mechanism by means of a linkage 68.

The device illustrated in Figure 6 includes a tube or pipe section 71 which is connected to the discharge side of a trap (not shown) and through which the intermittently discharged condensate flows in the direction of the arrow 72. The tube may be of straight, U-shape or of other curvilinear configuration. A flap 73 is secured at its upper extremity to a pin 74 which is pivotally mounted in the tube 71 one end of which projects through the tube. The shape of the flap and the adjacent cross-section of the tube are such as to permit the flap to pivot through an arc that is great enough to actuate the recording mechanism 13 which mechanism is connected to the projected end of pin 74 through a linkage 76. A spring 77, which interconnects the linkage 76 with a stationary member such, for example, as the tube 71, functions to return the pressure recording mechanism 13 and pressure responsive flap 73 to its normal closed position. In this position the flap abuts a lug 78 which may be formed integrally with the tube. One may advantageously construct the portion of the tube which is immediately adjacent the perimeter of the flap of such a shape as to maintain the intervening area between the inner wall of the tube and edge of the flap constant, thereby assuring the movement of the flap through a predetermined arc. This is illustrated in the drawing at 79 where the portion of the tube is of arcuate shape with the pin 74 as its axis. The fluid passing through the tube is not discharged until after the flap passes the point indicated by the numeral 81, this being the end of the arcuately shaped portion. This assures a movement of the flap sufficient to actuate the recording mechanism each time the trap discharges. Obviously, as in the case of the device illustrated in Figure 2, sufficient clearance is provided between the perimeter of the flap and the wall of the tube to allow for trap leakage.

The expression "steam trap of the intermittent discharge type" is used in the specification and the claims to designate a trap which discharges condensate intermittently, the amount of condensate discharged each time the trap is actuated being of substantially uniform volume.

From the foregoing description it will be apparent that I have provided a simple, inexpensive assembly of elements whereby one may not only observe from time to time whether a trap is functioning satisfactorily by noting the number of times which it has discharged during a given period, but one may obtain conveniently, an accurate measure of the quantity of condensate discharged; and, by registering at frequent intervals the amount so discharged, one may also obtain an accurate measure of the rate of condensate formation.

What I claim is:

1. In combination with a steam trap of the intermittent discharge type, a condensate discharge duct for said trap, a tell tale mechanism consisting of a fluid pressure responsive means communicatively connected to said discharge duct adapted to respond to the pressure created in the duct by the fluid which is intermittently discharged therethrough from the trap, a counting means cooperatively disposed with respect to the pressure responsive means for registering the number of pressure fluctuations in the discharge duct.

2. In combination with a steam trap of the intermittent discharge type, a counting mechanism, means disposed on the discharge side of the trap adapted to impede the flow of fluid therethrough and thereby create a differential pressure in said discharge line and means responsive to the pressure differential thus created adapted to operate the counting mechanism.

3. In combination with a steam trap of the intermittent discharge type, a counting mechanism, means disposed on the discharge side of the trap adapted to impede the flow of fluid therethrough and thereby create a differential pressure in said discharge line and means responsive to the pressure differential thus created adapted to operate the counting mechanism, said flow impeding means permitting fluid which seeps or leaks from the trap to flow through the flow impeding means without creating sufficient pressure to operate the counting mechanism.

4. In combination with a steam trap of the intermittent discharge type, a condensate duct connected to the discharge side of the trap, a cylinder in fluid communication with said duct having inlet and discharge ports, a piston operatively disposed in said cylinder adapted to be actuated by the fluid discharged from the trap through the duct, the discharge port of said chamber being so disposed with respect to the piston as to permit the flow of fluid therethrough after the piston has responded to the force of the discharged fluid, and a registering mechanism operatively connected with the piston.

5. In combination with a steam trap of the intermittent discharge type, a condensate duct connected to the discharge side of the trap, a cylinder in fluid communication with said duct having inlet and discharge ports, a piston operatively disposed in said cylinder adapted to be actuated by the fluid discharged from the trap through the duct, the discharge port of said chamber being so disposed with respect to the piston as to permit the flow of fluid therethrough after the piston has responded to the force of the discharged fluid, and a registering mechanism operatively connected with the piston, clearance between the piston and cylinder affording substantially unrestricted flow of fluid which may leak from the trap during the closed period of the cycle of operation of the trap.

6. In combination with a steam trap of the intermittent discharge type, a condensate duct connected to the discharge side of the trap, a cylinder in fluid communication with said duct having inlet and discharge ports, a piston operatively disposed in said cylinder adapted to be actuated by the fluid discharged from the trap through the duct, the discharge port of said chamber being so disposed with respect to the piston as to permit the flow of fluid therethrough after the piston has responded to the force of the discharged fluid, and a registering mechanism operatively connected with the piston, clearance between the piston and cylinder affording substantially unrestricted flow of fluid which may leak from the trap during the closed period of the cycle of operation of the trap, and a spring mechanism for returning the piston to a normal position.

7. In combination a steam trap of the intermittent discharge type, a registering mechanism, means disposed on the discharge side of the trap responsive to the pressure created by fluid discharged from the trap adapted to actuate the registering mechanism, said pressure responsive means being adapted to permit flow of fluid which may leak from the trap without actuating said registering mechanism.

8. The combination of a counting device, a steam trap of the intermittent discharge type, a trap discharge line and an actuating device which includes a chamber interposed in the discharge line having fluid inlet and discharge ports through which the trap condensate flows, a piston valve adapted to close the fluid line from the inlet port to the discharge port, a spring element for urging the piston in its normally closed position and adapted to return the piston to such normal position when the pressure of the fluid thereagainst is reduced and means for transmitting the motion of the piston to the counting device.

9. In combination with a steam trap of the intermittent discharge type, a condensate discharge duct for said trap, a tell tale mechanism consisting of a fluid pressure responsive means communicatively connected to the discharge duct adapted to respond to the pressure created in the duct by the fluid which is intermittently discharged therethrough from the trap, a registering means cooperatively disposed with respect to the pressure responsive means for registering the operation of the trap by the pressure fluctuations in the duct through which the condensate is discharged.

10. The combination of a counting device, a steam trap of the intermittent discharge type, a trap discharge line and an actuating device for the counting device which includes a piston chamber interposed in the discharge line having fluid inlet and discharge ports through which the trap condensate flows, a piston valve disposed within the piston chamber adapted to close the fluid line from the inlet to the discharge port, said piston valve being adapted to be actuated by the fluid discharged from said trap whereby the fluid may pass through the piston chamber, means for returning the piston to its normally closed position when the pressure of the fluid thereagainst is reduced, and means for transmitting the motion of the piston to the counting device.

11. The combination of a condensate pipe line system, a plurality of steam traps, each trap having a duct interconnecting said trap with the condensate pipe line system, and a tell tale mechanism for recording the operation of an individual trap consisting of a fluid pressure responsive means disposed in the duct interconnecting said trap with the condensate pipe line system, said means being adapted to respond to the force of the condensate in the duct which is intermittently discharged therethrough from the trap and registering means cooperatively disposed with respect to the fluid pressure responsive means for registering the actuation thereof.

CHARLES J. COLLEY.